June 23, 1959

J. L. BEHR 2,892,092

POWER TRANSMISSION

Filed Dec. 8, 1955

INVENTOR.
JOSEPH L. BEHR
BY Clement J. Paznokas
ATTORNEY 2,892,092

POWER TRANSMISSION

Joseph L. Behr, Affton, Mo., assignor to Vickers, Incorporated, Detroit, Mich., a corporation of Michigan Application December 8, 1955, Serial No. 551,953
10 Claims. (Cl. 250—206)

This invention relates to power transmission and more particularly to magnetic amplifier control in response to light radiation.

Saturable reactors utilized in magnetic amplifiers are generally controlled by saturation control windings wound on the same core with the power windings. In controlling a magnetic amplifier in response to light radiation, the light-sensitive element is usually connected in the control winding circuit whereby variations in the light radiation striking the element will vary the characteristics of the element and thereby the current through the control winding to vary the magnetic saturation and therefore the impedance of the power winding.

The present invention contemplates a novel type of light-responsive self-saturating magnetic amplifier wherein the light-sensitive element, instead of being in circuit with a separate control winding, is connected in a current path which shunts the saturating rectifier and supplies the reactor power winding with desaturating current, and where the light-responsive resistance of the light-sensitive element is employed to control the desaturating current and consequently the output of the amplifier. Thus, the necessity of a separate reactor control winding for the light-responsive element is eliminated, and the response time of the amplifier is increased as far as the input signal from the light-responsive circuit is concerned. Whenever a separate control winding can be eliminated, response time is reduced and more core-window area is available for the power winding of the reactor or for other control or bias windings which may be desired.

It is therefore an object of the present invention to provide a novel light-responsive magnetic amplifier.

Another object is to provide novel light-sensitive control means for magnetic amplifiers.

Another object is to provide a magnetic amplifier controlled in response to the light reaching a photocell without requiring an extra saturable reactor control winding in the photocell circuit.

Another object is to provide a light-sensitive magnetic amplifier utilizing a saturable reactor with a smaller than usual core for a given power requirement.

Still another object of the present invention is to provide a light-sensitive magnetic amplifier with a reduced response time.

Further objects and advantages of the present invention will be apparent from the following description, reference being had to the accompanying drawings wherein a preferred form of the present invention is clearly shown.

Figure 1:
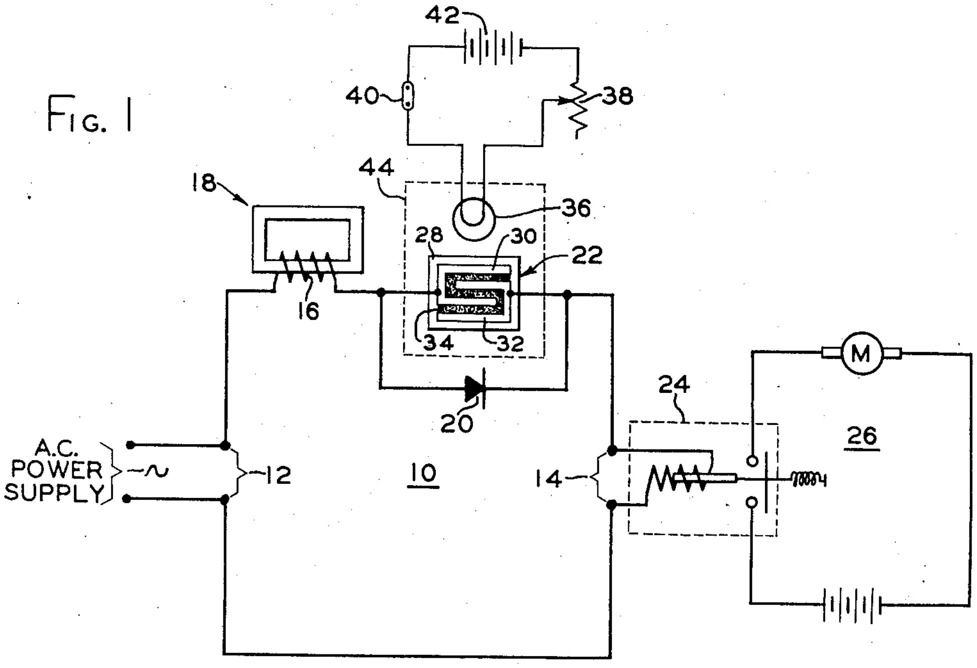
Fig. 1 is a schematic diagram of a light-controlled magnetic amplifier made in accordance with the present invention.

The term "self-saturating magnetic amplifier" has an accepted meaning in the art and refers to a circuit in which the power winding (output winding) of a saturable core reactor is always in series with a switching device having cyclic active and inactive periods, due for example to periodic mechanical contact or to asymmetric conduction or to other means, the device being conductive during the active periods and less conductive or nonconductive during the inactive periods. The switching device, for example, a half-wave rectifier, allows periodic, unidirectional, current pulses to flow in the power winding during the conductive or active periods of the switching device thereby resulting in the reactor having direct current premagnetization during the inactive periods of the switching device and to "fire" or go into magnetic saturation during the active periods of the switching device.

Magnetic saturation resulting from direct current premagnetization obtained as a result of intermittent, unidirectional, current pulses passing through the power winding is most commonly known as "self-saturation," although it has been referred to as internal regenerative feedback. In the ideal and otherwise uninfluenced circuit, this premagnetization is the point of residual magnetism of one polarity. Hereinafter, current flowing through the power winding in the direction which provides or aids the premagnetization will be referred to as saturating current, and the direction of such flow shall be referred to as the saturating direction. Thus current flowing through the winding and the series switching device, e.g., half-wave rectifier, in the high conductivity direction of the device during its active period is referred to as saturating current. On the other hand, current which flows through the power winding in a direction to oppose the premagnetization will be referred to as desaturating current; and the direction of its flow, the desaturating direction. The cyclic switching device, whether it be an asymmetric conductor, or mechanical means or other, may be referred to as the saturating valve or rectifier, because it provides the pulsed unidirectional current for self-saturation.

The firing angle or point during the active periods of the switching device at which a self-saturating reactor fires (goes into saturation), sometimes referred to as the control angle, is dependent on the premagnetization level during the inactive period. The higher the premagnetization, the earlier the firing point (smaller firing angle) and the longer the load current conduction period during the active period of the switching device. Thus, increasing the premagnetization increases the reactor output, and a decrease of premagnetization reduces the reactor output.

As hereinbefore stated, the premagnetization and consequently the output of such an amplifier is controlled in accordance with the present invention by controlling, in response to light radiation, the conductivity of a light-sensitive element connected in a current path including the reactor power winding, but bypassing the saturating one-way valve.

Included in the magnetic amplifier 10 shown in Fig. 1 are power input terminals 12 and output terminals 14, between which is interposed the impedance or power winding 16 of a saturable core reactor 18 connected in series with a one-way valve 20, and also in series with a light-sensitive device 22 whose conductivity is responsive to light. Any desired load 24, for example the relay shown, may be connected to the amplifier output terminals 14. The relay may be employed to operate any useful load 26, such as a lamp circuit, or the motor circuit shown, or any other desired load.

Although valve 20 and device 22 are in series with the winding 16, they are in parallel with each other in a circuit between the power input and the output of the amplifier. Thus device 22 and valve 20 are in different current paths between the power input and the output of the amplifier, one path including winding 16 and valve 20 but excluding device 22, the other path including winding 16 and device 22 but excluding valve 20.

The one-way valve 20 may be any suitable valve, for example a metallic rectifier such as a selenium rectifier. The light-sensitive device 22 may be of any type whose resistivity is responsive to the intensity or the wave length, or both, of light radiation, for example a photocell employing a light-sensitive material such as selenium, thallium sulphide, tellurium, silver oxide, bismuth sulfide, copper oxide, germanium, cadmium sulphide, cadmium selenide, lead sulphide, silicon, etc. The term "light" is employed herein in its broadest sense. As an illustrative example, the device 22 is shown in Fig. 1 as a photoconductive type of semiconductor photocell and includes an insulating base 28 carrying a pair of interdigitated spaced electrodes 30 and 32, between which is disposed the light-sensitive material 34, for example crystalline selenium. Characteristics and structural details of light-sensitive cells of various types are well known and further description thereof is unnecessary.

The resistance of a photoconductive cell usually varies from high to low as the intensity of the light is increased from low to high or as the particular wave length to which the cell is most responsive is approached. In the embodiment shown in the drawing the resistance or conductivity of the photocell 22 is controlled by the light emanating from a light source 36, for example the electric incandescent lamp shown connected through an intensity control 38 and a switch 40 to a battery 42. Both the photocell and the light source may be enclosed by a light-proof enclosure as indicated diagrammatically by the dashed line box 44 to prevent extraneous light from affecting the photocell.

The operation of the embodiment shown may be explained as follows. With the switch 40 open, the lamp 36 is "out" and the cell is at its "dark" resistance. When an alternating voltage is applied to the input terminals 12 the one-way valve subjects the reactor power winding 16 to an intermittent unidirectional current thus producing a certain degree of premagnetization in the reactor core due to self-saturation.

Specifically, during one half cycle of the applied voltage, current flows through the power winding 16, the valve 20 and the load 24 in the forward or high conductivity direction of the valve 20 (active period of rectification). On the opposite half cycle substantially no current flows in the circuit due to the high reverse resistance of the valve 20 (inactive period of rectification) and the high "dark" resistance of the photocell 22. This action results in the reactor having direct current premagnetization during the inactive or nonconducting half cycle of the valve 20, which causes the reactor to fire at a certain angle X during the active or conducting half cycle of the valve. It may be assumed that under these conditions (lamp 36 dark), the impedance of the winding will be at a minimum load current will flow through the load 24. The relay will be energized to close its contacts thereby connecting the battery to the motor in the motor circuit 26, and energizing the motor.

Now if the lamp 36 is "lighted" by closing switch 40 and light is directed upon a light-sensitive area of the photocell 20, its resistance will be substantially reduced. During one half cycle of the applied voltage, current will flow through the reactance winding and the valve in its forward or high conductivity direction. On the opposite half cycle, current flow in the opposite direction is blocked by the valve (except for leakage). However, due to the reduced resistance of the photocell, current will flow through the photocell 22 and through the power winding 16 in the desaturating direction, that is, in a direction to oppose the core premagnetization. The self-saturation or premagnetization will be reduced and cause the reactor to fire later in the active half cycle, thus increasing the impedance of the power winding and lowering the reactor output or load current. The relay will be de-energized and its contacts opened to de-energize the motor circuit 26.

Figure 2:
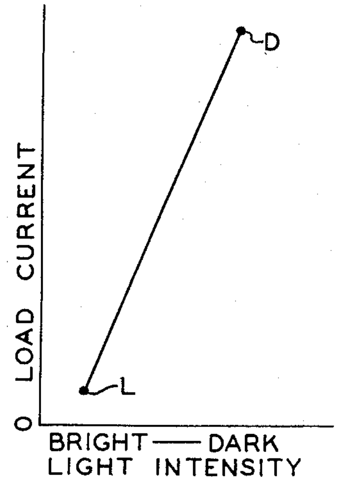
Fig. 2 is a curve indicating the output characteristic of the circuit of Fig. 1.

Fig. 2 shows a curve illustrating the control characteristics of the circuit of Fig. 1 in which load current is plotted against light intensity. Point D on the curve indicates the value of load current when the photocell 22 is not subjected to light or when it is in the relative darkness. Under this condition as hereinbefore described, the resistance of the photocell is at a maximum and the premagnetization or magnetic saturation of the reactor is at a maximum, thus the load current is of a maximum value at point D on the curve. When light is directed upon the photocell and the degree of light intensity increases, the load current decreases to some point L on the curve indicating the value of load current when the photocell 22 is subjected to a relatively high degree of illumination or light intensity. Under this condition the resistance of the photocell is low or at a minimum, and the premagnetization of the reactor core is considerably reduced thus resulting in a low or minimum value of load current as indicated on the curve by the point L. The relay connected to the amplifier output terminals of course will have drop-in and drop-out values of current falling somewhere between the points D and L on the curve in Fig. 2.

While a particular circuit is described and shown in the drawing herein, the invention is applicable to other self-saturating reactor circuits, and although the invention eliminates the need for a reactor control winding in the light-sensitive circuit, additional windings may be used if desired. Also, although a photocell of a particular type is described and shown herein, it will be apparent to those skilled in the art that other light-sensitive devices may be employed and that sources of light of various wave lengths consistent with the characteristics of the particular light-sensitive device used may be employed as the control light. For example the resistance of selenium is sensitive to and responsive to infrared light, visible light, ultraviolet light, etc.

While the form of embodiment of the invention as herein disclosed constitutes a preferred form, it is to be understood that other forms might be adopted, all coming within the scope of the claims which follow.

What is claimed is as follows:

1. A magnetic amplifier comprising power input and output circuits, and means coupled to said input and output circuits for controlling the flow of power between the input and output circuits, said means comprising a reactor with a saturable core and a power winding on said core, and means for controlling the impedance of said winding by affecting the magnetization of said core, said last means comprising means including a first path including said winding for passing intermittent unidirectional current through said winding in a particular direction, and means including a second path including said winding and with light-responsive resistivity for passing current through said winding in the opposite direction.

2. A self-saturating magnetic amplifier comprising a reactor with a saturable core and a power winding on said core, a unidirectional device connected in series with said winding for passing intermittent unidirectional current through said winding in a particular direction, and means having light-responsive conductivity connected in series with said winding and effectively in shunt with said device for passing current through said winding in the opposite direction in response to light.

3. A self-saturating magnetic amplifier comprising a reactor with a saturable core and a power winding, and means for controlling the impedance of said winding by affecting the magnetization of said core, said means comprising a current path including a one-way valve connected in series with said winding for passing intermittent unidirectional current through the winding in a particular direction, means including a second current path including said winding for passing current through said winding in the opposite direction, and means having light-responsive resistance for controlling the latter current.

4. A magnetic amplifier comprising a reactor with a saturable core and a power winding on said core, means for controlling the impedance of said winding by affecting the magnetization of said core, said means comprising a current path including a one-way valve connected in series with said winding for passing intermittent unidirectional current through said winding in a particular direction, means including a second current path conductively connected to said winding for passing current through said winding in the opposite direction, and means having light-responsive conductivity connected in said second current path for controlling the latter current.

5. A self-saturating magnetic amplifier comprising power input and output circuits, means coupled to said input and output circuits for controlling the power supplied to the output circuit, said means comprising a saturable reactor with a magnetic core and a power winding on said core, a one-way valve connected in series with said winding for passing intermittent unidirectional current through said winding when an alternating voltage is applied to the input circuit, and a light-responsive circuit effectively in shunt with said valve for passing desaturating current derived from said alternating voltage through said winding.

6. A magnetic amplifier comprising power input and output circuits, means coupled to said input and output circuits for controlling the power supplied to the output circuit, said means comprising a saturable reactor with a magnetic core and a power winding, a half-wave rectifier connected in series with said winding for passing unidirectional current through said winding on the conducting half cycle of said rectifier when an alternating voltage is applied to the input circuit, and a current path including said winding and excluding said rectifier for passing desaturating current derived from said alternating voltage through said winding on the nonconducting half cycle of said rectifier, said path including means having light-responsive conductivity for controlling said desaturating current.

7. A self-saturating reactor circuit comprising a power input circuit connectable to a source of alternating voltage, an output circuit connectable to a load, a saturable reactor having a magnetic core and a power winding connected between the input and output circuits, a half-wave rectifier connected in series with said winding for passing intermittent unidirectional current through said winding during the conducting half cycle of said rectifier when alternating voltage is applied to said input circuit, a control circuit for controlling the impedance of said winding by affecting the magnetization of said core, said control circuit comprising a path including said winding and bypassing said rectifier for passing desaturating current derived from said alternating voltage through said winding during the nonconductive half cycle of said rectifier, said path including means having light-responsive conductivity, and a source of light adapted to subject said latter means to light radiation.

8. A self-saturating magnetic amplifier comprising power input and output circuits, a reactor with a saturable core and a power winding connected between the input and output circuits, a rectifier connected in series with the winding for passing intermittent unidirectional current through the winding in a particular direction when an alternating voltage is applied to the input circuit, a photocell shunting said rectifier for passing current through said winding in the opposite direction, and means for subjecting said photocell to light radiation to control the flow of the latter current through said winding.

9. A magnetic amplifier comprising a reactor with a saturable core and a power winding on said core, a unidirectional device connected in series with said winding for passing intermittent unidirectional current through said winding in a particular direction, means having light-responsive conductivity connected in series with said winding and effectively in shunt with said device for passing current through said winding in the opposite direction in response to light, and means for subjecting the latter means with light radiation to control the conductivity thereof.

10. A magnetic amplifier comprising power input and output circuits, means coupled to said input and output circuits for controlling the power supplied to the output circuit, said means comprising a saturable reactor with a magnetic core and a power winding on said core, a one-way valve connected in series with said winding for passing intermittent unidirectional current through said winding when an alternating voltage is applied to the input circuit, a light-responsive circuit in series with said winding and bypassing said valve for passing desaturating current derived from said alternating voltage through said winding, and means for subjecting said light-responsive circuit to light radiation.

References Cited in the file of this patent

UNITED STATES PATENTS

| | | |
|---|---|---|
| 1,728,929 | Ernst et al. | Sept. 24, 1929 |
| 1,997,179 | Logan | Apr. 9, 1935 |
| 2,012,573 | Long | Aug. 27, 1935 |
| 2,125,273 | Farrand | Aug. 2, 1938 |
| 2,169,093 | Edwards | Aug. 8, 1939 |
| 2,494,876 | Hornpeck | Jan. 17, 1950 |
| 2,733,307 | Ogle | Jan. 31, 1956 |
| 2,737,599 | Goldsmith et al. | Mar. 6, 1956 |